United States Patent Office 3,480,639
Patented Nov. 25, 1969

3,480,639
PROCESS FOR PREPARING CRYSTALLINE PYRIDINIUM 2-NITRO-1 BUTYL SULFATE
John F. Stucker, Houston, Tex., assignor to Nalco Chemical Company, Chicago, Ill., a corporation of Delaware
No Drawing. Filed June 6, 1966, Ser. No. 555,216
Int. Cl. C07d 31/48, 31/40
U.S. Cl. 260—294.8    6 Claims

ABSTRACT OF THE DISCLOSURE

Crystalline pyridinium 2-nitro-1-butyl sulfate is prepared by neutralizing 2-nitro-1-butyl hydrogen sulfate with pyridine in 1-propanol. A crystalline product of high purity is obtained in a stable form which can be used in solvent solutions as an anti-microbial agent without giving off lachrymatory fumes under conditions of use.

---

This invention relates to crystalline pyridinium 2-nitro-1-butyl sulfate and to a process for the preparation thereof.

Solutions of pyridinium 2-nitro-1-butyl sulfate have heretofore been used as microbiocides. In general, however, the use of such solutions has left much to be desired because of instability and the tendency to give off a lachrymatory substance, especially when diluted to use concentrations with water. Due to the instability and the decomposition which apparently occurs in such solutions, two liquid layers will form in a matter of a few months.

For the foregoing reasons it would be desirable to produce pyridinium 2-nitro-1-butyl sulfate in a stable form which can be stored without decomposition and which can be diluted with solvents, such as water, without giving off lachrymatory fumes under conditions of use.

One of the objects of the present invention is to produce pyridinium 2-nitro-1-butyl sulfate in a crystalline form which is stable over a long period of time, has very little odor, has a purity of at least about 95%, and gives off no lachrymatory fumes under conditions of use.

A further object is to prepare new and improved liquid microbiocidal compositions made from a stable crystalline pyridinium 2-nitro-1-butyl sulfate.

Another object of the invention is to provide a new and improved process for producing crystalline pyridinium 2-nitro-1-butyl sulfate.

An additional object of the invention is to provide a process of the type described in which the crystalline pyridinium 2-nitro-1-butyl sulfate has a purity of at least about 95%. Other objects will appear hereinafter.

In accordance with the invention it has been found that crystalline pyridinium 2-nitro-1-butyl sulfate of high purity can be formed by neutralizing 2-nitro-1-butyl hydrogen sulfate with pyridine in 1-propanol as a solvent.

The process is preferably carried out by sulfating 2-nitro-1-butanol wtih chlorosulfonic acid, sulfur trioxide or sulfuric acid. It is preferable not to use a solvent in the sulfation. The resultant 2-nitro-1-butyl hydrogen sulfate is then neutralized with pyridine using 1-propanol as a solvent. This produces a slurry which is cooled and the crystalline product is filtered or centrifuged from the supernatant liquid. The result product is a white, crystalline pyridinium 2-nitro-1-butyl sulfate of sufficient purity to be a stable useful commercial chemical with no further purification.

In carrying out the sulfation step, it is preferable to use chlorosulfonic acid at a temperature of less than 30° C. A slight excess of acid is usually required to react with all of the nitrobutanol. However, a large excess should be avoided because any chlorosulfonic acid remaining will be neutralized by the subsequent addition of pyridine to form pyridinium sulfate, which is an undesirable by-product. The sulfation reaction involves the use of equimolar proportions of 2-nitro-1-butanol and the sulfating agent. In general, it is preferable to use a molar excess of sulfating agent of 2% to 8%.

Neutralization of the sulfation product wtih pyridine can be carried out by adding the pyridine to the sulfation product, or the sulfation product can be added to pyridine. Relatively low temperatures, preferably less than 35° C., are desirable to keep dark colored impurities from forming in the supernatant liquid. The alcohol solvent can be present at the start of the neutralization or it can be added at any time before complete neutralization. Generally, a final pH of about 2.5 to 3.0 has been found to give the best yield of highest purity crystals.

The ratio of solvent to crystalline product is not as critical for 1-propanol as it would be for less desirable solvents. A weight ratio of crystals to solvent of about 2:1 gives a flowable slurry which can be easily handled. The amount of solvent should be sufficient to keep the by-products in solution and a 2:1 ratio seems to be satisfactory for this purpose. The main impurity has been identified as pyridine sulfate and it is highly desirable to keep its concentration at a minimum during the process so that its solubility product is not exceeded during the product crystallization step.

The invention will be further illustrated but is not limited by the following examples in which the quantities are given by weight unless otherwise indicated.

EXAMPLE I 750 grams of chlorosulfonic acid was added slowly to 720 grams of 2-nitro-1-butanol at a temperature of 20° C. to 25° C. The mixture was allowed to react for one-half hour and a vacuum was then pulled to remove the residual hydrogen chloride. The resultant sulfation product was slowly added to 630 grams of pyridine in 600 grams of 1-propanol at a temperature below 30° C. until a pH of 2.5–3.0 was obtained. The slurry was then cooled to 15–18° C. for two hours and filtered. The precipitate was washed with a small amount of 1-propanol and allowed to dry at room temperature. The yield of pyridinium 2-nitro-1-butyl sulfate was 1333 grams (80.0% of theory) in the form of white crystals of 95.7% purity.

EXAMPLE II

The procedure was the same as in Example I except that 125 grams of chlorosulfonic acid was added gradually to 120 grams of 2-nitro-butanol. The resultant product was then added to 81 grams of pyridine in 100 grams of 1-propanol giving a final pH of 1.7. The yield was slightly less than in Example I.

EXAMPLE III

The procedure was the same as in Example II except that only 160 grams of 1-propanol was used to give a yield approximately the same as that obtained in Example II and only slightly less than that obtained in Example I.

EXAMPLE IV

The procedure was the same as in Example III except that the final pH was 3.3 and the yield was about 74.2%.

When the process was carried out in the same general manner as in Example I but using 2-propanol as a solvent instead of 1-propanol, crystals of pyridinium 2-nitro-1-butyl sulfate were obtained but they only had a purity of 81%.

When the process was carried out using acetone as a solvent, a yield of only 61% of crystalline pyridinium 2-nitro-1-butyl sulfate was obtained.

When the process was carried out using water as a solvent a 39.5% yield of pyridinium 2-nitro-1-butyl sulfate was obptained.

When the process was carried out as in Example IV using the same amount of 2-propanol instead of 1-propanol, the yield of pyridinium 2-nitro-1-butyl sulfate was less than one-third the yield obtained with the 1-propanol as a solvent.

In general, it was found that there was essentially no difference in yield when the amount of 1-propanol was varied or when the final pH to which the solution was neutralized was changed. However, when 2-propanol was employed as a solvent, the yield varied considerably depending upon the pH and the amount of solvent. Also, the purity of the crystals decreased as the yield increased.

It was surprising to discover that only the use of 1-propanol as a solvent gave both relatively high yields and a purity of at least 95%.

The compounds of the invention can be employed as powerful antimicrobial substances in a wide variety of applications, either alone or in combination with other substances, for example, in disinfectants, soaps, detergents, paints, and the like. They are effective as microbiocides against many different types of micro-organisms when employed as solutions in inhibitory concentrations from less than 5 parts per million to 100 parts per million. They can be employed, for example, to inhibit the growth of *Staphylococcus aureus, Salmonella schottmuelleri, Shigella flexneri, Klebsiella pneumoniae*, sulfate reducing bacteria, slime forming bacteria, *Botyrodiplodia* sp., *Thielaveopsis* sp., tomato rot organisms, potato rot organisms, rose disease organisms and fresh garden soil organisms. It will be understood, however, that the use of the pyridinium 2-nitro-1-butyl sulfate and processes involving its use do not constitute a part of this invention.

The invention is hereby claimed as follows:

1. A process for producing crystalline pyridinium 2-nitro-1-butyl sulfate which comprises neutralizing 2-nitro-1-butyl hydrogen sulfate with pyridine in 1-propanol in sufficient amount to form a slurry and recovering crystalline pyridinium 2-nitro-1-butyl sulfate.

2. A process as claimed in claim 1 in which the weight ratio of pyridinium 2-nitro-1-butyl sulfate crystals to 1-propanol is about 2:1.

3. A process as claimed in claim 1 in which the final pH of the neutralized slurry is within the range of 2.5 to 3.0.

4. A process as claimed in claim 1 in which the temperature during neutralization does not exceed about 35° C.

5. A process as claimed in claim 1 in which the 1-propanol is present at the beginning of the neutralization with pyridine.

6. A process as claimed in claim 1 in which the 1-propanol is added after the beginning of the neutralization with pyridine.

References Cited

UNITED STATES PATENTS

| 2,971,002 | 2/1961 | Fely | 260—294.8 |
| 3,305,578 | 2/1967 | Maurer et al. | 260—459 |

OTHER REFERENCES

The Naming & Indexing of Chemical Compounds (Am. Chem. Soc., Easton, Pa. 1962), § 393.

HENRY R. JILES, Primary Examiner

C. M. SHURKO, Assistant Examiner

U.S. Cl. X.R.

260—999